Figure 1:
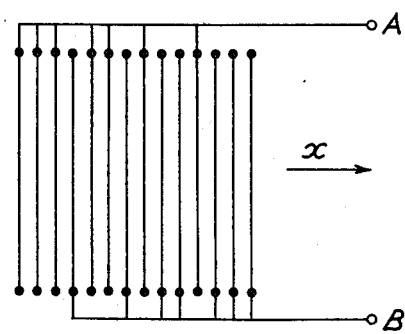

United States Patent [19]

Mathieson et al.

[11] 4,392,057
[45] Jul. 5, 1983

[54] POSITION-SENSITIVE RADIATION DETECTOR

[75] Inventors: Ernest Mathieson; Graham C. Smith; Philip J. Gilvin, all of Leicester, England

[73] Assignee: National Research Development Corporation, London, England

[21] Appl. No.: 235,989

[22] Filed: Feb. 19, 1981

[30] Foreign Application Priority Data

Feb. 22, 1980 [GB] United Kingdom ............... 8005981

[51] Int. Cl.³ .............................................. G01T 1/18
[52] U.S. Cl. .................................................. 250/385
[58] Field of Search ............ 250/361 R, 363 R, 363 S, 250/366, 367, 368, 369, 374, 385; 313/93

[56] References Cited

U.S. PATENT DOCUMENTS 3,786,270 1/1974 Borkowski et al. ................ 250/385
4,203,035 5/1980 Grenier ............................. 250/367

Primary Examiner—Alfred E. Smith
Assistant Examiner—Janice A. Howell
Attorney, Agent, or Firm—Cushman, Darby & Cushman

[57] ABSTRACT

Apparatus for sensing the position by received radiation in which a multiplicity of discrete sensors are spaced in at least one sensing direction and are connected in at least two groups, the density of sensors in each group ranging along the sensing direction, each group having a different variation and at least one sensor in each group being affected by received radiation. The ratio of the sum of the influence of radiation on one group to the sum of the influence on all groups gives a measure of the position of received radiation.

9 Claims, 4 Drawing Figures

POSITION-SENSITIVE RADIATION DETECTOR

In this specification, the term "radiation" is used in a wide sense meaning either electromagnetic radiation, for example at X-ray or visible wavelengths, or particles such as mesons or protons.

One example of a known type of position-sensitive radiation detector is a multi-wire proportional chamber (MWPC). Methods of derivation of position information from multi-wire proportional chambers can be considered to form three groups. In the first group the avalanche position, in one dimension, is derived from the two signals developed at the ends of a uniform resistive or inductive line. The line may be distributed uniformly along the ends of the cathode wires, or anode wires, or may itself form one of the electrodes. Only two signal processing channels are required and good linearity can be achieved; the operation or fabrication of the line, however, generally presents certain constraints.

The second group of methods derives the avalanche position by computing the centroid of the induced charge distribution on the cathode. This is accomplished by dividing the cathode into a sufficiently large number of uniform strips and measuring the induced charge on each. Both analogue and digital computations of the centroid have been used. The 'centroid' methods are inherently linear and can achieve very high resolution but the total signal processing systems are considerably more complex and generally slower than those of the 'line' methods.

A third group of methods exist which, although similar to the second group in that no resistive or inductive line is employed, are considerably simpler since only two signal processing channels are used. These 'progressive geometry' methods obtain positional information by noting the function of charge induced on each of two specially shaped components of a divided cathode; such cathodes may be difficult to manufacture.

In another approach, in the medical field, an Anger camera is used to sense the scintillations from a scintillator; a large number of photomultipliers (up to 90) may be needed to provide an adequate record, which is cumbersome.

According to the invention, apparatus for sensing the position of received radiation comprises a multiplicity of discrete sensors which are influenced by the radiation, the sensors being spaced in at least one sensing direction and being connected so as to form at least two groups, the density of sensors in each group (that is, the number of sensors per unit distance) varying along said direction, the variation being different for each group, each group extending along substantially the whole of said direction, and the spacing of the sensors and the arrangement of groups being such that the received radiation affects at least one sensor in each group; means for summing the influence of the radiation on each group of sensors; and means for determining the ratio of the influence on one group of sensors to the total influence on all of the sensors.

In one embodiment the sensors are equispaced in a linear array and are connected in two groups, the density of one group increasing and the density of the other group decreasing along the array. The increase and decrease may be linear or non-linear. Each sensor may be, for example, one wire of a multi-wire cathode in a multi-wire proportional chamber; as is conventional in such chambers, the received radiation does not influence the wires directly; each discrete radiation event generates an electron avalanche at the anode, and it is the presence of the avalanche which influences several of the wires by induction of a charge on each wire.

In another embodiment the sensors are equispaced in two orthogonal directions to form a two-dimensional array and are connected in four groups, the density of a first group increasing in the first and the second orthogonal directions, the density of a second group increasing in the first and decreasing in the second orthogonal direction, the density of a third group decreasing in the first and increasing in the second orthogonal direction and the density of a fourth group decreasing in both orthogonal directions. Each sensor may be, for example, the end of a light guide such as a fibre optic which can receive either discrete optical events or continuous optical radiation; the so-called sensors in this case merely transfer the light to a conventional light intensity sensitive device.

Also according to the invention, a method of sensing the position of radiation comprises providing a multiplicity of discrete sensors which are influenced by the radiation, the sensors being spaced in at least one sensing direction and being connected so as to form at least two groups, the density of sensors in each group varying along said direction, the variation being different for each group, each group extending along substantially the whole of said direction and the spacing of the sensors and the arrangement of groups being such that the received radiation affects at least one sensor in each group; summing the influence of the radiation on each group of sensors, and determining the ratio of the influence on one group of sensors to the total influence on all of the sensors.

In any arrangement, the invention may be used to provide the position in one or two dimensions of a single radiation event, such as the position of an X-ray event; or the position of a multiplicity of events may be determined and combined to provide a two-dimensional picture, such as an image of an organ of the human body after dosage with a suitable radioactive source.

Figure 2:
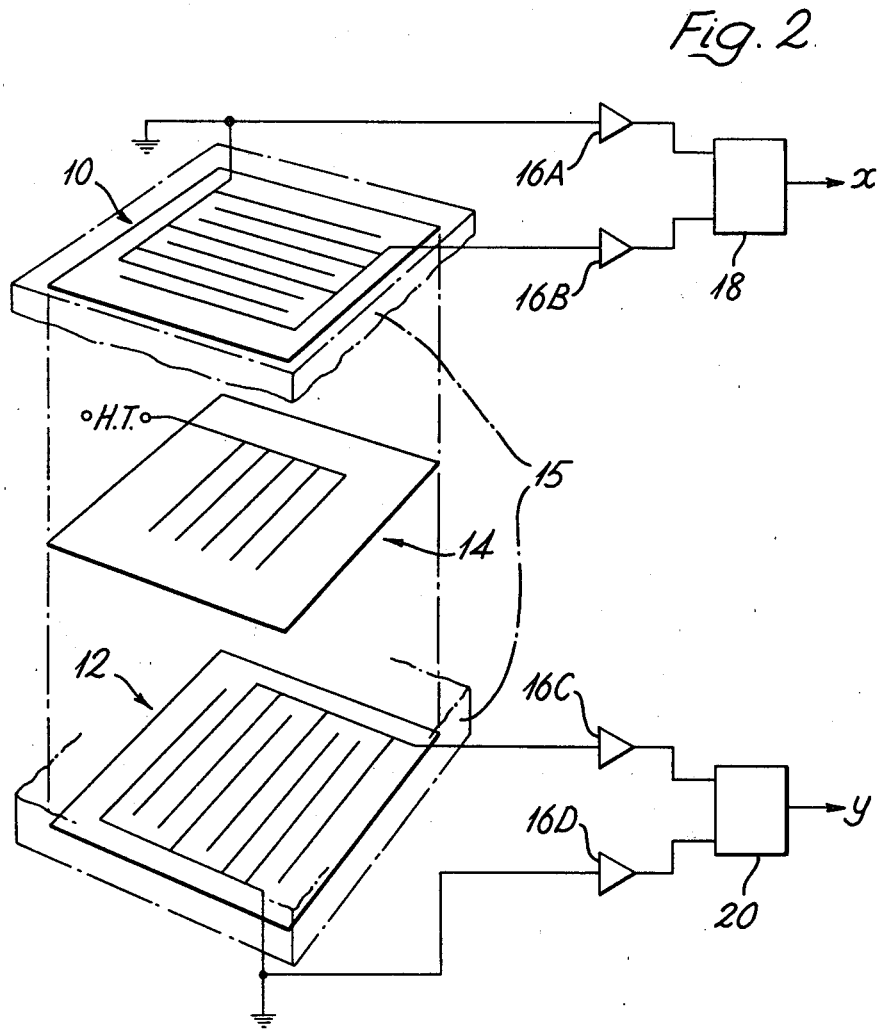
Figure 3:
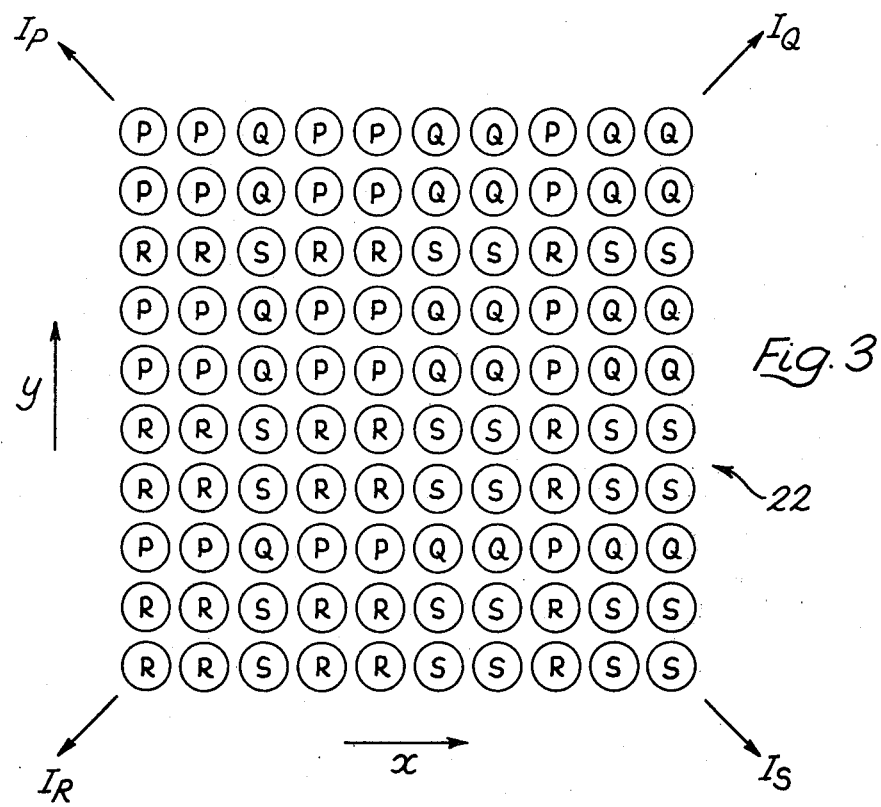
Figure 4:
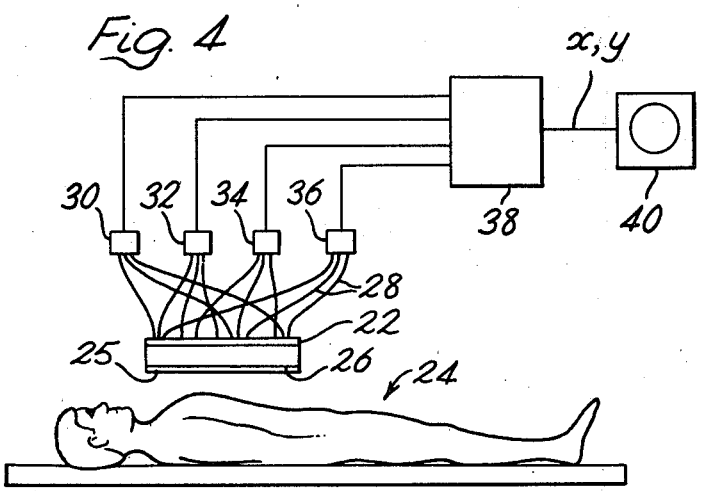

The invention will now be described by way of example with reference to the accompanying drawings in which:

FIG. 1 indicates schematically the principle of the present invention, applied in one dimension to a cathode of a multi-wire proportional counter;

FIG. 2 indicates schematically a MWPC;

FIG. 3 indicates the principle of the present invention applied in two dimensions; and FIG. 4 shows a two-dimensional application in an Anger camera.

FIG. 1 illustrates fourteen wires of a cathode of a multi-wire proportional counter. The wires are straight, parllel and connected as two groups to terminals A and B.

If an axial or sensing direction along which position is to be sensed is indicated by the arrow x, then the connections of wires into each group can be such that the linear density (number per unit distance) of each group varies in a specific way with position across the cathode. This will be referred to as the principle of "graded density". For example the increase may be linear, i.e. it can be arranged that $\nu_B$, the linear density of group B, increases approximately linearly with position x across the cathode (perpendicular to the wire direction) and, necessarily, the density of group A decreases approximately linearly. That is $$v_B \simeq N\{\tfrac{1}{2} + a(x - \tfrac{1}{2})\}$$

$$v_A \simeq N\{\tfrac{1}{2} - a(x + \tfrac{1}{2})\}$$

In these expressions N is the total number of wires in the cathode and the constant a defines the rate at which the density of each group varies. Clearly $v_A + v_B = N =$ constant. For convenience distances will be normalised to the total cathode width. The situation is illustrated only schematically in FIG. 1. It should be noted that the pitch remains constant across the cathode and hence, provided that the two groups are connected to virtual earths then this graded density cathode is geometrically and electrostatically identical to a normal wire cathode.

Now suppose that a chamber avalanche occurs, inducing on the cathode a charge with centroid position x. Then, provided that the cathode pitch is small compared with the width of the induced charge distribution, and also that this width is small compared with the total cathode width, the fraction of induced charge on each group will be proportional to the local linear density of that group. Thus if the actual induced charges are $q_A$ and $q_B$ then $$Q = \frac{q_B}{q_A + q_B} \simeq \frac{v_B}{v_A + v_B} \simeq ax + \tfrac{1}{2}(1 - a)$$

Thus the quantity Q will be an approximately linear function of the position of the induced charge centroid, independent of the charge magnitude, and therefore suitable as a position signal. The positional sensitivity S of the system is given by $$S = dQ/dx \simeq a$$

If $a = 1$ then $Q = x$ and $S = 1$.

From linearity considerations only, an ideal graded-density cathode would have an infinitesimally small pitch with linear grading of the density of each group of wires. With a finite and constant pitch, exact linear grading is not possible and an approximation must be employed. This approximation leads to some local non-linearity.

An application of the principle of graded density will now be described. The principle is applied in one dimension to each of two groups of wires which are arranged orthogonally. FIG. 2 illustrates a multi-wire proportional counter comprising two cathode arrays 10, 12, with an anode array 14 between them. Each array consists of a multiplicity of equispaced conducting wires. The cathode arrays are connected to virtual earths and the anode array is connected to a d.c. source which maintains it at a high positive voltage which respect to the cathodes. The wires in cathode array 10 lie perpendicular to the x axis and the position along that axis is sensed, while the wires in the other array lie parallel to the x axis and position along the orthogonal y axis is sensed. As in a conventional MWPC the cathode and anode arrays are enclosed in a gas tight container 15 to which a conventional converting gas is supplied.

In contrast to a conventional MWPC, the cathode planes are not connected to a resistive or inductive delay line, but are each connected in two groups; cathode array 10 forms group A and B which are connected to respective charge-sensitive pre-amplifiers 16A, 16B which in turn supply input signals to a sum-and-ratio circuit 18. The wires in cathode array 12 are connected in two groups C and D through respective pre-amplifiers to a sum-and-ratio circuit 20.

In use, an ionising particle enters the sensing system and is converted in the gas in the usual way to cause an anode avalanche which induces positive charge on several wires in each cathode array. The charge received by wires in each group is amplified and supplied to the respective sum-and-ratio circuit. As explained with reference to FIG. 1, calculation of $q_B/(q_A+q_B)$ gives a signal proportional to the position of the avalanche in the x direction, and a similar ratio gives the position in the y direction. Thus the one-dimensional principle of graded density is applied twice to give a two-dimensional position signal.

While the illustrations show only fourteen wires, in practice many more wires will be used so that a good approximation to linear density grading can be achieved. Perfect linear density is only reached with infinitely small pitch, therefore to meet the restraint of a constant pitch, some approximation in the connections to each group is required. With constant pitch, $a = 1$ and:

$$v_A = N(1-x) \text{ and } v_B = N_x$$

The procedure employed to achieve this approximation was to calculate provisional wire positions $x_A'$, $x_B'$ for the two groups from the expressions $$x'_A = 1 - \sqrt{1 - 2n_B/N} \text{ and } x'_B = \sqrt{2n_B/N}$$

where $n_A$, $n_B$ are the total number of wires of each group lying between 0 and $x_A'$, $x_B'$, respectively. The integers $n_A$, $n_B$ clearly have values 1 to N/2. The wires in the actual constant pitch cathode were then connected such that the wires nearest to the positions $x_A'$ were A wires and those nearest to the position $x_B'$ were B wires. Table I gives the group, A or B, each wire in a 190 wire cathode.

TABLE I

| Wire No. | Group | Wire No. | Group |
|---|---|---|---|
| 1 | A | 33 | A |
| 2 | A | 34 | B |
| 3 | A | 35 | A |
| 4 | A | 36 | A |
| 5 | A | 37 | A |
| 6 | A | 38 | A |
| 7 | A | 39 | B |
| 8 | A | 40 | A |
| 9 | A | 41 | A |
| 10 | A | 42 | A |
| 11 | A | 43 | A |
| 12 | A | 44 | B |
| 13 | A | 45 | A |
| 14 | A | 46 | A |
| 15 | A | 47 | A |
| 16 | A | 48 | B |
| 17 | A | 49 | A |
| 18 | A | 50 | A |
| 19 | A | 51 | A |
| 20 | B | 52 | B |
| 21 | A | 53 | A |
| 22 | A | 54 | A |
| 23 | A | 55 | A |
| 24 | A | 56 | B |
| 25 | A | 57 | A |
| 26 | A | 58 | A |

TABLE I-continued

| Wire No. | Group | Wire No. | Group |
|---|---|---|---|
| 27 | A | 59 | B |
| 28 | B | 60 | A |
| 29 | A | 61 | A |
| 30 | A | 62 | B |
| 31 | AB | 63 | A |
| 32 | A | 64 | A |
| 65 | B | 99 | A |
| 66 | A | 100 | B |
| 67 | A | 101 | A |
| 68 | B | 102 | B |
| 69 | A | 103 | A |
| 70 | A | 104 | B |
| 71 | B | 105 | B |
| 72 | A | 106 | A |
| 73 | B | 107 | B |
| 74 | A | 108 | A |
| 75 | A | 109 | B |
| 76 | B | 110 | A |
| 77 | A | 111 | B |
| 78 | B | 112 | B |
| 79 | A | 113 | A |
| 80 | A | 114 | B |
| 81 | B | 115 | A |
| 82 | A | 116 | B |
| 83 | B | 117 | B |
| 84 | A | 118 | A |
| 85 | B | 119 | B |
| 86 | A | 120 | A |
| 87 | A | 121 | B |
| 88 | B | 122 | B |
| 89 | A | 123 | A |
| 90 | B | 124 | B |
| 91 | A | 125 | B |
| 92 | B | 126 | A |
| 93 | A | 127 | B |
| 94 | B | 128 | B |
| 95 | A | 129 | A |
| 96 | B | 130 | B |
| 97 | A | 131 | B |
| 98 | B | 132 | A |
| 133 | B | 162 | B |
| 134 | B | 163 | A |
| 135 | A | 164 | B |
| 136 | B | 165 | B |
| 137 | B | 166 | B |
| 138 | B | 167 | B |
| 139 | A | 168 | B |
| 140 | B | 169 | B |
| 141 | B | 170 | B |
| 142 | B | 171 | A |
| 143 | A | 172 | B |
| 144 | B | 173 | B |
| 145 | B | 174 | B |
| 146 | B | 175 | B |
| 147 | A | 176 | B |
| 148 | B | 177 | B |
| 149 | B | 178 | B |
| 150 | B | 179 | B |
| 151 | B | 180 | B |
| 152 | A | 181 | B |
| 153 | B | 182 | B |
| 154 | B | 183 | B |
| 155 | B | 184 | B |
| 156 | B | 185 | B |
| 157 | A | 186 | B |
| 158 | B | 187 | B |
| 159 | B | 188 | B |
| 160 | B | 189 | B |
| 161 | B | 190 | B |

Typical dimensions of the 190 wire cathode are pitch 0.5 millimeters, giving 9.5 centimeters transverse to the wires, by 9 centimeters parallel to the wires, wire diameter 25 micrometers. Two such cathodes may be used with a 9×9 centimeter anode having 15 micrometer wires at 2 millimeter spacing, a cathode to anode spacing of between 4 and 8 millimeters and a drift region of depth 12 millimeters.

A lower limit to cathode pitch is set by inter-component capacitance C, which influences the equivalent noise charge $\Delta q$ in each channel and also slightly affects the system sensitivity S; if the dynamic input capacitance to each amplifier 16 is $C_{in}$, then:

$$S = C_{in}/[C_{in} + 2C]$$

Since resolution $\Delta x = \Delta q/S$ it is clearly important that $C_{in}$ should be large compared with C. For a cathode having the dimensions given above, C=66pF.

The two most important factors in determining the non-linearity contribution from a graded density cathode are cathode pitch and anode-cathode spacing h. A cathode having the dimensions described above was used experimentally with a beam of X-rays of energy 1.5 keV and width 50 micrometers to investigate non-linearity. As expected, an increase in anode-cathode spacing and a decrease in pitch both cause striking decreases in the non-linearity of the device. With h=6 millimeters, Table II shows experimental values of root mean square non-linearity as a percentage of cathode width.

TABLE II

| cathode position | $q_a = 0.25$ pC | 1.5 pC |
|---|---|---|
| above anode | 0.36 | 0.30 |
| below anode | 0.35 | 0.33 |

A minimum resolution of 150 micrometers was achieved, but it is believed that limitations were imposed by items of the experimental apparatus other than the graded density cathode. Theoretically an intrinsic non-linearity of less than 0.25% is expected.

It will be clear from Table I that towards the outer edges of each cathode in the respective orthogonal directions there are large concentrations of wires all in the same group. Position within such a group cannot be determined; the cathodes can only provide position information provided at least one wire in each group is influenced.

It is a great advantage of the present invention that it is essentially identical in structure to a conventional wire cathode, so that electrons, e.g. from an X-ray photon absorption, can be drifted through the cathode from a drift and diffusion region so that sharing between anode wires can effect a degree of interpolation and so that a high detection efficiency can be achieved.

The invention has been described with reference to multi-wire cathodes of constant pitch. One method of reducing local non-linearities may be to vary the pitch.

The invention has been described with reference to an array of parallel wires connected in two graded-density groups. It is also possible to connect the wires in three or more graded-density groups, although it is expected that two groups will be the most useful arrangement.

FIG. 2 illustrates two arrays, each density-graded into two groups, with one orthogonal position sensed by each array. It is also possible to use several such arrays in series in one or both directions so that position is determined by which array senses a particle, in addition to the position of the particle within that array. This allows a detecting system of large dimensions to be provided. Such sub-division has the advantage of reducing the capacitance seen by each pre-amplifier so that a better signal to noise ratio is obtainable. Under certain circumstances the inter-winding capacitance causes a non-linearity of performance but this non-linearity can be cancelled, at least in part, by use of a density grading which is non-linear.

In a further variation, density grading is used only over the central 80% of the cathode width and conventional windings are used over the remainder.

In yet another variation, the densities of a two-group constant pitch cathode are graded according to the (non-linear) equations:

$$v_B = Cx/(1+x) \text{ and } v_A = C/(1+x) \text{ then } q_B/q_A = x,$$

and an appropriate signal processing circuit is provided.

The invention is not limited in its application to MWPC; in another application in which the position of electrical charge is sensed, the invention can be applied to channel plate arrays.

An important variation of the invention is illustrated in FIG. 3 which shows the ends of one hundred light guides arranged in a 10×10 matrix reference 22. The guides are connected in four groups, P, Q, R and S; each group is graded so as to increase or decrease in the two orthogonal directions x, y. For example the density of group P decreases in the x direction and increases in the y direction. Suppose the array is arranged to receive radiation, in this case light at visible wavelengths, from a source such as a scintillator, the light guide dimensions and spacings being such that light from one scintillation is received by several guides in each direction of the matrix. If the intensities of illumination received by guides in the four groups are represented by $I_P$, $I_Q$, $I_R$, $I_S$, $$\text{then } \frac{I_Q + I_S}{I_P + I_Q + I_R + I_S} = kx + C \quad (4)$$

$$\text{and } \frac{I_Q + I_P}{I_P + I_Q + I_R + I_S} = ky + C \quad (5)$$

where x, y are the position co-ordinates of the scintillations and k and C are constants.

Application of such a matrix is illustrated in FIG. 4. A human patient 24, after treatment such as dosage by radio-iodine, is viewed through a conventional lead collimator 25 by an inorganic crystal scintillator 26 of conventional form; the scintillator is viewed by a multiplicity of guides 28 with their ends arranged adjacent to the scintillator in the matrix 22; the light guides transmit light from the scintillator to four photomultipliers 30, 32, 34, 36 which each receive light from one group of guides; the photomultipliers sum the received light and their output signals pass to a sum and ratio circuit 38 which derives x and y position signals in accordance with equations (4) and (5) for each scintillation and supplies the signals to a storage CRT 40 or other suitable recording device so that a two-dimensional picture of the patient is built up. The drastic reduction in the number of photomultipliers in comparison with a conventional Anger camera is clear. In another application, a gas scintillation proportional counter can provide photons which are sensed by a detector using graded density electrodes.

The invention is not limited to the examples given, but the principle of graded density can be applied in any situation in which a multiplicity of discrete sensors are arranged in a one or two-dimensional array. Radiation may be sensed directly, or induced or collected electrical charge can be sensed, after a conversion process if necessary. It is expected that in most cases for two-dimensional sensing of electric charge, two orthogonal linear arrays will be used, while for direct radiation collection a two-dimensional array can be provided, but clearly the type of arrangement required depends on the type of sensor used.

We claim:

1. A position sensitive radiation detector comprising at least one linear array of discrete collector elements spaced apart from one another simultaneously to receive radiation at a plurality of positions defining an extensive radiation-sensitive region, said linear array comprising two interleaved groups of collector elements, each group extending over substantially the whole of said region and comprising elements whose mutual spacing is non-uniform, that of one group increasing from one end of said region to the other and that of the other group decreasing in a complementary manner so that the mutual spacing of the collective elements of said groups is substantially uniform, output means coupled to each of said collector elements to generate an output signal when radiation is incident on the associated collector element, first and second summing circuit means respectively connected to the output means associated with one of said groups of collector elements and ratio-determining circuit means to determine the relative levels of the summed signals for the two groups of signal output means.

2. Apparatus according to claim 1 in which the sensors are equispaced in a linear array along the sensing direction and are connected in two groups, the density of one group increasing and the density of the other group decreasing along the array.

3. Apparatus according to claim 2 in which the density of one group increases linearly and the density of the other group decreases linearly along the array.

4. Apparatus according to claims 1, 2 or 3 in which each discrete sensor comprises one wire of a multiwire cathode in a multiwire proportional chamber.

5. Apparatus according to claim 1 in which the sensors are equispaced in two orthogonal directions to form a two-dimensional array and are connected in four groups, the density of a first group increasing in the first and the second orthogonal directions, the density of a second group increasing in the first and decreasing in the second orthogonal direction, the density of a third group decreasing in the first and increasing in the second orthogonal direction, and the density of a fourth group decreasing in both orthogonal directions.

6. Apparatus according to claim 5 in which each sensor comprises one end of a light guide, the ends being arranged in an equispaced two dimensional array and the other end of each guide being arranged in one of said four groups, and there being further provided four conventional optical radiation sensors arranged one adjacent each group of said other ends of the light guides.

7. Apparatus for sensing the position of received radiation which is a multiwire proportional chamber having first and second parallel planar cathode arrays of parallel equispaced wires, the wires in one array being perpendicular to the wires in the other array, the wires in each cathode array being connected so as to form two groups such that the density of wires in one group increases and the density of wires in the other group decreases along the array, each group extending over substantially the whole array and the arrangement of groups being such that received radiation affects at least one wire in each group;
- a planar anode array of parallel equispaced wires between the two cathode arrays;
- a first sum and ratio circuit to which the groups of wires in the first cathode array are connected and a second sum and ratio circuit to which the groups of wires in the second cathode array are connected, the ratio circuits each providing a signal corresponding to the position in the corresponding cathode array at which radiation is received;
- means for applying a positive electrical potential to the anode wires; and
- means for containing a converting gas around the cathode and anode arrays.

8. Apparatus for sensing the position of received discrete optical radiation comprising a collimator; a scintillator; a multiplicity of light guides arranged with their first ends adjacent the scintillator in a two-dimensional array and with their second ends arranged in four groups, such that the density of the first ends in each group varies in two orthogonal directions, the variations being different but complementary for each group, and the spacing of the sensors and the arrangements of groups being such that each scintillation in the scintillator affects the end of at least one guide in each group; four photomultipliers arranged one adjacent each group of second ends of the fibres; and a sum and ratio circuit to which the photomultipliers are connected and which provides a position signal indicating the position in the planar scintillator at which each scintillation occurs.

9. A method of sensing the position of received radiation comprising providing a plurality of discrete sensors adapted to produce an output signal in response to the radiation, the sensors being substantially uniformly spaced in at least one sensing direction to define a sensing region and being connected so as to form at least two interleaved groups each of which extends over substantially the whole length of said region, the mutual spacing of the sensors of the first of said groups being non-uniformly spaced and increasing from one end of said region to the other whilst that of the second of said groups decreases in a complementary manner, summing the output signals from each of the two groups and determining the relative magnitudes of the summed signals.

* * * * *